United States Patent

[11] 3,584,515

| [72] | Inventor | Laszlo B. Matyas<br>8212 Pawtucket Drive, Huntington Beach,<br>Calif. 92646 |
|---|---|---|
| [21] | Appl. No. | 790,008 |
| [22] | Filed | Jan. 9, 1969 |
| [45] | Patented | June 15, 1971 |

[54] PROPULSION APPARATUS
9 Claims, 13 Drawing Figs.

| [52] | U.S. Cl. | 74/84 |
|---|---|---|
| [51] | Int. Cl. | F16h 27/04 |
| [50] | Field of Search | 74/84 S, 84 |

[56] References Cited
FOREIGN PATENTS
770,555   3/1957   Great Britain............... 74/87

*Primary Examiner*—Milton Kaufman
*Attorney*—Fulwider, Patton, Rieber, Lee & Utecht ABSTRACT: A propulsion apparatus having a movable frame which mounts a plurality of masses for rotation about a common axis, and which includes various systems for varying the radius of gyration of each of the masses as they pass through a predetermined sector of the path of rotation. This results in an unbalanced centrifugal force which propels the frame in a direction which depends upon the location of the sector in which the unbalance occurs.

PATENTED JUN 15 1971

INVENTOR.
LASZLO B. MATYAS
BY Fulwider, Patton, Rieber,
Lee and Utecht
ATTORNEYS

PATENTED JUN 15 1971

INVENTOR.
LASZLO B. MATYAS
BY Fulwider, Patton, Rieber,
Lee and Utecht
ATTORNEYS

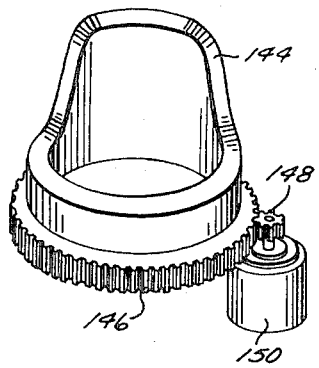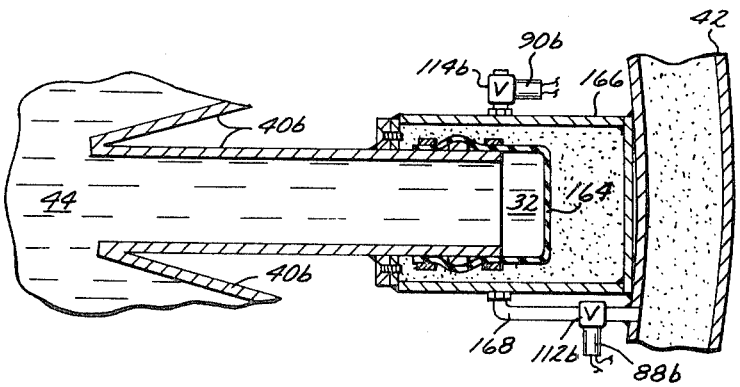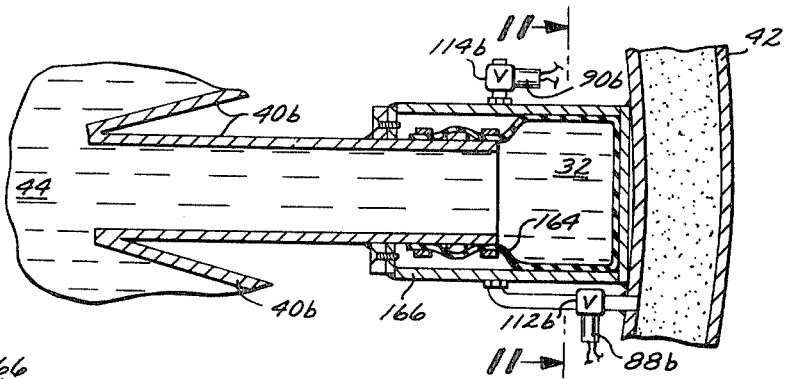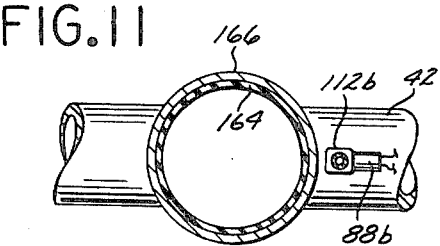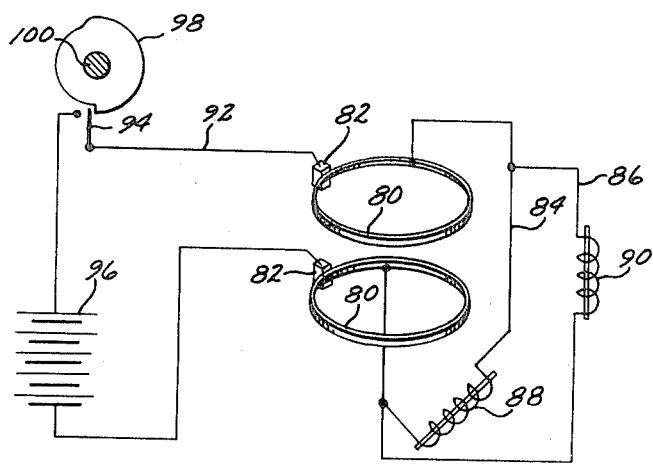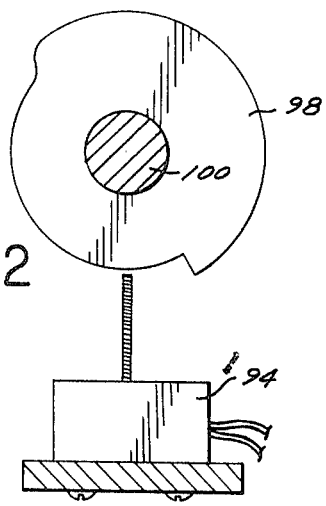

PROPULSION APPARATUS

BACKGROUND OF THE INVENTION

1. Field of the Invention

The present invention relates to propulsion apparatus, and particularly to propulsion apparatus which depends upon the utilization of unbalanced centrifugal force to achieve unidirectional movement of a vehicle or the like.

2. Description of the Prior Art

Heretofore, the propulsion of nearly every form of vehicle, including those which operate in the air, on land, or on the water, utilizes some element which reacts against a medium. Thus, aircraft and ships are propelled by movement of a propeller through air or water, and land vehicles are driven by engagement between wheels or the like and the ground. Jet and rocket engines are the primary exceptions, but these are characterized by a number of undesirable complexities of construction and operation.

SUMMARY

According to the present invention, a propulsion apparatus is provided which does not require any reactive engagement with a supporting surface or fluid medium. The apparatus instead achieves a unidirectional, unbalanced centrifugal force by employing rotating masses which are unbalanced during their passage through predetermined sectors of their rotation. This is achieved in several ways by the various embodiments of the invention.

For example, the rotating masses can be bodies of a liquid of relatively high specific gravity, such as mercury, with means being provided to force the liquid from one side of the axis of rotation to the other. Such transfer is accomplished over a very short interval of the rotation so that the masses of the rotating bodies on opposite sides of the axis of rotation are simultaneously increased and decreased, respectively. Alternatively, the liquid is not transferred between diametrically oppositely located liquid containers. Instead, the liquid in one or more of the containers on one side of the axis of rotation is simply moved radially inwardly and then axially along such axis, and the liquid in the opposite containers is moved axially and thence radially outwardly. This has the desired effect of achieving the condition of unbalanced centrifugal force, but without providing a series of diametrically oriented conduits for liquid passing across the axis of rotation.

The agency utilized to effect liquid transfer takes a number of different forms in the various embodiments of the invention. In one arrangement the liquid is contained within a collapsible member which is collapsed under air pressure to squeeze the contained liquid radially inwardly. In other arrangement the liquid is carried within a cylinder between two floating pistons, the radially outwardly located ones of said pistons being sequentially moved inwardly under the influence of fluid under pressure to thereby move the associated liquid radially inwardly. In a variation of this latter arrangement the radially inwardly located pistons are operated upon by push rods or other mechanical means to force the associated liquid radially outwardly, it being understood, of course, that in all embodiments the sequential actuation of the fluid containing members is suitably controlled so as to locate the centrifugal force unbalance for movement of the mounting frame in the proper direction.

Other objects and features of the invention will become apparent from consideration of the following description taken in connection with the accompanying drawings.

BRIEF DESCRIPTION OF THE DRAWINGS

FIG. 8 is an enlarged detail perspective view of the cam of the propulsion apparatus of FIG. 5, the means for adjusting the circumferential position of the cam also being illustrated;

FIG. 9 is a partial horizontal cross-sectional view of a third embodiment of propulsion apparatus according to the present invention, the apparatus being essentially identical to the apparatus of FIG. 2 except in the details illustrated;

FIG. 10 is a view similar to that of FIG. 9, but showing the collapsible container for the liquid in its expanded state, as compared to the collapsed state thereof which is illustrated in FIG. 9;

FIG. 11 is a view taken along the line 11-11 of FIG. 10;

FIG. 12 is an enlarged view taken along the line 12-12 of FIG. 4; and

FIG. 13 is a diagrammatic view of the electrical circuit and associated components for effecting liquid transfer at the proper time.

DESCRIPTION OF THE PREFERRED EMBODIMENTS

Figure 1:
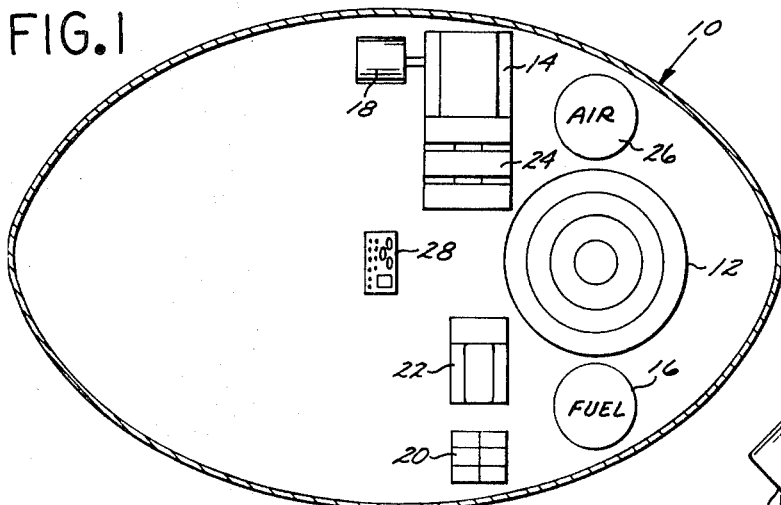
FIG. 1 is a simplified top plan view of a typical vehicle incorporating propulsion apparatus according to the present invention.

Referring now to FIGS. 1—4, 12, and 13, there is illustrated a movable platform or frame taking the form of a vehicle 10, and which is moved or propelled by a propulsion apparatus 12 according to the present invention. Although the invention will be described in connection with the vehicle 10, the present propulsion apparatus in its various embodiments can be utilized to propel virtually any form of movable frame, as well as vehicles of all types. Thus, the apparatus 12 can be used to propel aircraft, automotive vehicles, boats, trains, and the like. The aircraft can be either those types utilizing lifting surfaces, or space vehicles depending entirely upon thrust for their flight.

The vehicle 10 which is illustrated is essentially a diagrammatic showing of a somewhat elongated, but generally saucer-shaped structure which is hollow to enclose or house the apparatus 12 and its associated equipment, as well as the operators of the vehicle 10. As will be seen, more than one propulsion apparatus 12 can be utilized, with the number and arrangement being such as will provide for rapid movement of the vehicle 10 either horizontally or vertically, and also to provide for balancing of torques developed by the rotating masses of the apparatus 12.

The interior of the vehicle 10 houses a suitable engine 14 which is fueled from a tank 16, and which is operative to drive an electrical generator 18. The generator 18 is connected to a set of electrical storage batteries 20 and also to an electric drive motor 22. The drive motor 22, as will be seen, is operative to effect rotation of the masses of the apparatus 12.

The internal combustion engine 14 also operates a suitable multistage air compressor 24 to charge a compressed air tank 26 with air at a relatively high pressure. For simplicity and brevity, the interconnections between the equipment just described is omitted, the details thereof being obvious to one skilled in the art. All of this equipment is operated from a suitable control panel 28 located in the center of the vehicle 10.

The particular drive means for effecting rotation of the rotatable masses of the propulsion apparatus 12, as well as the particular means for providing pressurized fluid, such as air, can be varied to suit the particular requirements of each application, and the present invention is not limited to, for example, internal combustion engines, electric motors, or the like. For example, where the vehicle 10 is intended to be operated in outer space, the drive means may comprise an atomic reactor as the power source, combined with suitable turbine and generator equipment, and electric motors to drive the compressor and rotate the rotatable masses of the apparatus 12. The adaptability of the present apparatus 12 to such variations will become apparent as the present description proceeds.

With particular reference to the construction of the centrifugal force unit or apparatus 12, the apparatus comprises, generally, the supporting frame constituted by the vehicle 10; a rotatable assembly 30 carried by the vehicle 10 and including a plurality of liquid bodies or masses 32 rotatable as a part of the assembly 30 about a central rotational axis 34. The apparatus 12 also includes a mass transfer means operative to vary the radius of gyration of the liquid masses 32 during their rotation about the axis 34. In the embodiment illustrated in FIG. 2, the mass transfer means is constituted in part by a plurality of free-floating pistons 36 which move radially inwardly and outwardly to vary the center of gravity of the associated liquid mass 32 relative to the rotational axis 34. In addition, the propulsion apparatus 12 includes control means for cyclically operating the mass transfer equipment to thereby vary the radius of gyration of the liquid masses 32 at a particular point or sector of their rotational travel about the axis 34 so that an unbalanced centrifugal force occurs which is generally unidirectional in nature. As will be seen, the unidirectional character of the unbalanced centrifugal force is responsible for movement of the vehicle 10 in the desired direction.

The unbalanced centrifugal force is, in effect, a thrust force capable of moving the vehicle 10 without any requirement of traction or like interengagement between the vehicle 10 and a supporting surface or medium.

The unbalanced centrifugal force is a result of varying the radial distance of the center of gravity of the masses 32 from the central axis 34, that is, the radius of gyration. This is accomplished in several ways according to the present invention, the first way being by a transfer of a portion of the liquid mass 32 radially inwardly and outwardly, the portion of each mass 32 which is moved inwardly being transferred to its complemental, oppositely located mass 32 for movement thereof in a radially outward direction, the combination of these mass changes causing the desired unbalanced centrifugal force.

The liquid constituting the masses 32 is preferably one having a relatively high specific gravity. Mercury is preferred for this reason, although other fluids may be used, either alone or in combination with solid masses, such as pistons, movable therewith.

Figure 2:
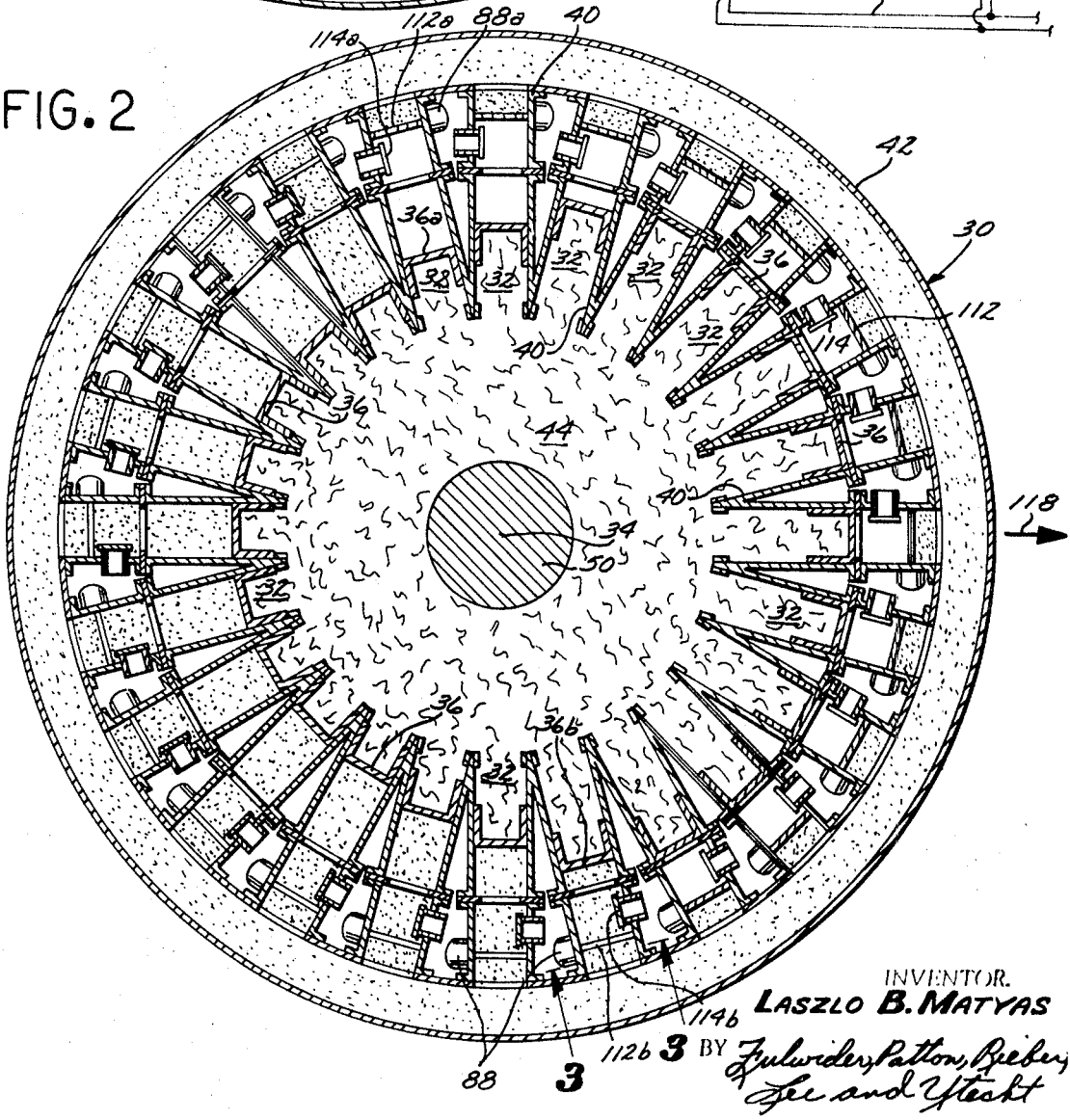
FIG. 2 is an enlarged horizontal cross-sectional view of the propulsion apparatus of FIG. 1.

The liquid nature of the masses 32 enables relatively rapid mass transfer, as will be seen, which permits operation of the apparatus 12 at a relatively high rate of rotation. The rotational speed of the rotating masses 32 has a very great effect on the magnitude of the unbalanced centrifugal force produced by the apparatus 12.

Where the masses 32 are constituted of heavy fluids, the associated pistons, if any, are preferably relatively light in weight, serving simply as a means to effect movement of the liquid masses, as will be seen. In contrast, if relatively heavy pistons are used, the pistons then constitute the bulk of the masses being transferred and a gaseous medium could be substituted for the liquid, the gaseous medium then serving simply as an agency for effecting movement of the pistons to vary their radii of gyration, as will be apparent. In the embodiment of FIG. 2, compressed air is utilized to effect movement of the pistons 36 and the associated liquid masses 32, but it will be apparent that various other non-noxious gases could be utilized for this purpose, being derived either from a compressor-tank combination, or from a battery of interconnected gas bottles. Also, it is possible that liquids could be used instead of gases, provided that such liquids were of relatively low specific gravity compared to the liquid between the pistons.

Figure 4:
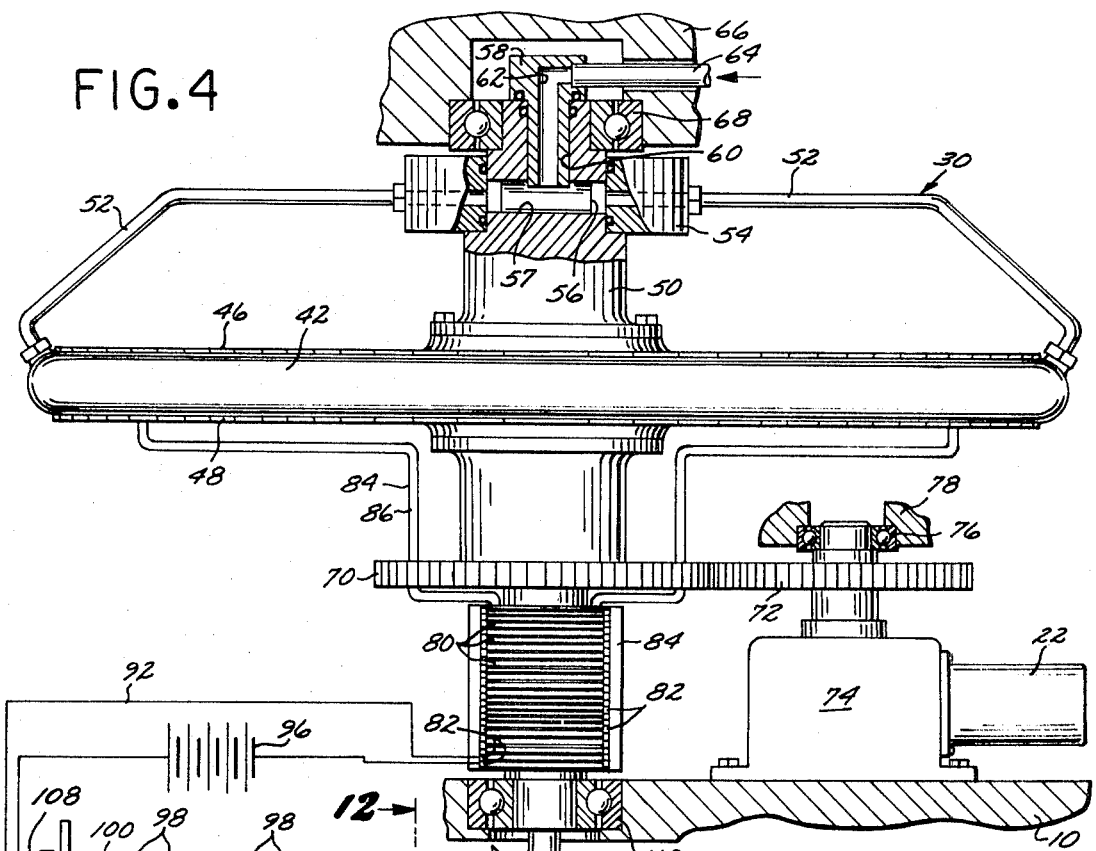
FIG. 4 is a side-elevational view of the propulsion apparatus of FIG. 2, portions thereof being sectioned for clarity, and other portions being indicated generally diagrammatically.
Figure 6:
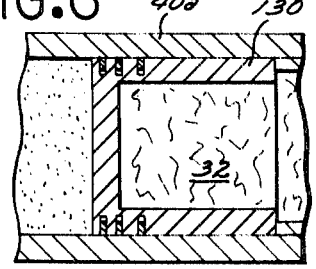
FIG. 6 is an enlarged detail view taken along the line 6-6 of FIG. 5.

As best seen in FIGS. 2 and 4, the rotatable assembly 30 includes a plurality of radially oriented open-ended cylinders 40 which slideably accommodate the pistons 36 within their inwardly oriented extremities. The inner ends of the cylinders 40 are integrally interconnected for common rotation, and the outer ends of the cylinders 40 are rigidly connected to a circumferentially oriented annular air manifold 42, which also forms a part of the rotatable assembly 30. As will be seen, air under pressure is introduced into the manifold 42 for action against the radially outward faces of the pistons 36 to drive them radially inwardly.

The cylinders 40 do not extend completely to the center of the rotatable assembly 30, but instead surround a central space or reservoir 44 which is filled with liquid mercury. As best seen in FIG. 4, a pair of cover plates 46 and 48 overlie and underlie, respectively, the reservoir 44 to contain the liquid mercury. The outer margins of the plates 46 and 48 are secured to the cylinders 40, while the center of the plates includes central openings through which a drive shaft 50 is disposed, and to which the plates are secured in fluidtight relation. With this arrangement, any rotation of the shaft 50 is accompanied by corresponding rotation of the cylinders 40 and the manifold 42.

Two or more equally circumferentially spaced air conduits or lines 52 extend from the air manifold 42 upwardly and thence inwardly to an air distributor ring 54. The ring 54 is suitably secured in fluidtight relation to a reduced diameter portion of the upper extremity of the shaft 50, the ring 54 including a plurality of air passes in communication with the air lines 52, and opening radially inwardly to a circumferential groove 56 defined between the ring 54 and the shaft 50. The groove 56, in turn, opens into a diametrically oriented air passage 57 provided in the shaft 50, and in communication with an air coupling 58. The coupling 58 is rotatably fitted in fluidtight relation within a vertically disposed opening 60 provided in the upper extremity of the shaft 50 in communication with the passage 57.

The coupling 58 includes a central air passage 62 which at its lower end is in communication with the passage 57, as previously indicated, and at its upper end is in communication with an air line 64 carried by a member 66 which is fixed relative to the rotatable assembly 30, being secured in any suitable fashion (not shown) to the fixed structure of the vehicle 10. The member 66 is mounted to the outer race of a bearing 68, the inner race of which is carried by the upper extremity of the shaft 50. With this arrangement, air from the tank 26 is enabled to pass through the conduit 64 to pressurize the air manifold 42 of the rotatable assembly 30 during rotation of the assembly 30.

The lower portion of the shaft 50 mounts a gear 70 which is driven by a gear 72 mounted to the output shaft of a speed reduction mechanism 74. The outer end of the shaft is suitably supported by a usual bearing 76 carried by fixed structure 78 forming a part of the vehicle 10.

The speed reduction mechanism 74 is operated by the drive motor 22. As will be apparent, adjustment of the speed reduction mechanism 74 through a control means such as the control panel 28 varies the speed of rotation of the shaft 50.

A plurality of vertically spaced electrical slip rings 80 are carried by the shaft 50 below the gear 70. A plurality of electrical brushes 82 ride upon the slip rings 80, and are carried in a cylindrical brush mounting sleeve 84, the particular interengagement between the rings 80 and brushes 82 being illustrated diagrammatically in FIG. 13.

More particularly, the brushes 82 and the rings 80 are operative in pairs, a pair of the brushes 82 being rotatably slideable upon a pair of the rings 80, with a pair of parallel connected electrical circuits 84 and 86 extending from one ring to the other. The circuit 84 includes a solenoid 88, and the circuit 86 includes a solenoid 90, both solenoids being energized upon completion of an electrical circuit 92 connected to the brushes 82. The circuit 92 includes a normally open switch 94 connected in series with a source of electrical energy, such as a battery 96. The switch 94 is closed upon engagement with the cam rise of a cam 98 which is fixed to a shaft 100. As best seen in FIG. 4, there are a plurality of the cams 98 mounted upon the shaft 100, the number of cams corresponding to the number of cylinders 40 of the rotatable assembly 30. As will be apparent, the rise of each successive cam 98 along the length of the shaft 100 is so located that the plurality of complemental switches 94 are operated sequentially. One end of the shaft 100 mounts a bevel gear 102 which is driven by a complemental bevel gear 104 mounted at the lower end of a reduced diameter section of the drive shaft 50. The opposite end of the shaft 100 is rotatably carried by a mounting plate 106 which is fixed in any suitable fashion to the fixed structure of the vehicle 10. The end of the shaft 100 opposite the bevel gear 102 mounts an adjustment knob 108 by means of which the shaft 100 may be moved axially to the left, as viewed in FIG. 4, to disengage the gears 102 and permit the shaft 100 to be rotated in any desired amount so as to thereby alter the point or sector in the path of rotation of the assembly 30 at which the various switches 94 are closed. As will be seen, this has the effect of adjusting the point or sector within which the various cylinders 40 of the mass transfer assembly are actuated.

The lower extremity of the shaft 50 is suitably rotatably mounted to the vehicle 10 by means of a conventional bearing 110, as best illustrated in FIG. 4.

Figure 3:
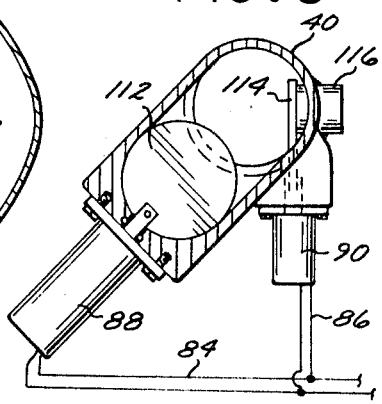
FIG. 3 is an enlarged detail view taken along the line 3-3 of FIG. 2.

Referring now to FIGS. 2 and 3, the radially outward extremity of each cylinder 40 is adapted to be closed off or isolated from the air manifold 42 by means of a disc-shaped gate or valve 112 which is slideable between a closed position, which closes off the associated cylinder 40, and the open position illustrated in FIG. 3. The valve 112 is moved to its open position upon energization of the associated solenoid 88 which, in turn, is caused by closure of the associated switch 94, as previously described. Simultaneously with energization of the solenoid 88, the energization of the parallel connected solenoid 90 moves a similar slideable disc-shaped gate or valve 114 which in its closed position overlies a vent port 116 located radially inwardly of the valve 112. The port 116 is operative to vent compressed air from the cylinder space defined between the valve 112 and the face of the associated piston 36, the venting being to the environment within the vehicle 10.

The valves 112 and 114 and the solenoid actuation thereof are merely exemplary, and any suitable means may be utilized for admitting and exhausting compressed air to and from the spaces adjacent the pistons 36. Likewise, the particular surface finish, material, and number of the cylinder-piston-valve combinations can be varied as required.

In operation, the pilot or other operator starts the engine 14 to operate the motor 22 to effect rotation of the shaft 50, and also to provide a supply of compressed air in the tank 26. Air from the tank 26 is fed through the air lines 52 to the air manifold 42 to provide constant pressurization of the cylinder spaces located radially outwardly of the inlet valves 112.

The knob 108 is operated to locate the rises of the cams 98 for actuation of their associated switches 94 when the rotated positions of the associated cylinders 40 are located, for example, on the right side of the axis of rotation 34, as viewed in FIG. 2. Thus, as the cylinders 40 rotate about the axis 34 in a clockwise direction, as viewed in FIG. 2, energization of the solenoid indicated at 88a closes the valve 112a, and the simultaneous energization of the complemental solenoid 90 (not shown) causes the associated valve 114a to open.

This action seals the cylinder off from the compressed air in the manifold 42, and vents compressed air from the space between the valve 112a and the face of the associated piston 36. Consequently, any tendency of the piston 36 to be moved radially outwardly is allowed so that the radius of gyration of the liquid mass 32 in the cylinder space radially inwardly of the piston 36 tends to gradually increase as the clockwise rotation of the cylinder proceeds. In this regard, the piston does tend to move radially outwardly because of the opposite movement of the diametrically oppositely located piston, which is generally indicated by the numeral 36b in FIG. 2.

That is, the cam rise of the cam 98 associated with the piston 36b is out of engagement with its switch 94 so that the associated solenoids are deenergized. In the deenergized state of such solenoids, the associated valve 112b is open and the valve 114b is closed. This admits air under pressure into the cylinder space radially outwardly of the piston 36b, which drives the piston 36b radially inwardly. The displaced liquid mass located radially inwardly of the piston 36b moves into the central reservoir 44, the collective effect of which is to allow a corresponding quantity of such liquid mass to move into the cylinder space beneath the oppositely located piston 36a.

Movement of each piston 36 in this manner takes place over its period of rotation through approximately the half revolution through the area or sector on the right side of the axis 34, as viewed in FIG. 2. The collective effect of the increase in the radii of rotation of the liquid masses to the right of the axis 34, and the corresponding reduction in the radii of gyration of the pistons 36 located to the left of the axis 34 causes an unbalanced centrifugal force condition to develop, which results in movement of the vehicle 10 in the direction of the arrow 118.

The speed of movement in the direction of the arrow 118 can be controlled by varying the rate of rotation of the shaft 50, while directional control is achieved by varying the angular position at which the pistons 36 move radially outwardly which, as previously indicated, is effected by rotation of the cam shaft 100. In this regard, the cam shaft 100 may be rotated in such a way that a braking effect is provided by developing an unbalanced centrifugal force in the direction opposite the direction of the arrow 118 during movement of the vehicle in such direction. Moreover, although not shown, it will be apparent that the propulsion apparatus 12 can be mounted in such a way that its plane of rotation can be varied from the horizontal so as to alter the altitude of climb, for example, of the vehicle 10. The rotating masses 32 tend to develop a torque, and this can be offset by stacking or superposing another propulsion apparatus 12 above the apparatus 12 just described. A plurality of stacked units can thus be employed, and one or more of the apparatus 12 can be oriented so that its plane of rotation is vertical, thereby achieving further directional stability and control. The directions of rotation of stacked units would be opposite so as to cancel any developed torque. Various other arrangements will occur to those skilled in the art, and such obvious variations are within the scope of the present invention.

Referring now to FIGS. 5 through 8, there is illustrated a second embodiment of the present invention, generally designated by the numeral 120. Where the components of the apparatus 120 are similar in function to components of the apparatus 12, similar numerals will be employed with the subscript a.

More particularly, the propulsion apparatus 120 includes a rotatable assembly 30a which is rotatable with the shaft 50 by means of a key interconnection 122. The assembly 30a includes a plurality of radially oriented containers or cylinders 40a which each includes a radial portion 124 and an axial portion 126, the radial portion extending radially outwardly of the shaft 50, and the axial portion 126 forming an axially oriented extension of the portion 124. The radially inward extremities of the cylinders 40a are integrally interconnected by a web 128.

Each radial portion 124 slideably accommodates a free-floating piston 130, and the axial portion 126 slideably accommodates a piston 132. A liquid mass 32 of mercury is located in the space between each pair of the pistons 130 and 132.

The pistons 130 are normally urged radially inwardly by air under pressure provided through associated conduits 52a which are connected to an air manifold 42a. Additional conduits 134 extend from the air manifold 42a to the lower extremity of the cylinder portions 126 to admit air under pressure to the outer faces faces of the pistons 132. With this arrangement, the air pressures are equal on the opposite sides of the column of liquid in each of the cylinders 40a, with the cylinders 130 being urged against the masses 32 so that the masses 32 tend to follow movements of the pistons 132. In this regard, each piston 132 is connected to a rod 136 which is axially slideably movable through an opening in the end wall of the cylinder portion 126. The lower end of each rod 136 is attached to a U-shape mount 138 which rotatably mounts a cam roller 140. A compression spring 142 is interposed between the end wall of the cylinder portion 126 and the roller mount 138 to bias the associated piston 132 downwardly.

Gradual movement of each rod 136 upwardly is caused by engagement of the associated roller 140 with the track of a cam 144, which is best viewed in FIG. 8. The cam 144 is characterized by a single cam rise so that the cam rollers 140 are raised during half of each revolution of their associated cylinder 40a about the axis 34.

The cam 144 is integral with a gear 146 which is adjustably rotatable by a spur gear 148 which is driven by a control motor 150. That is, the gear 146 and the cam 144 are normally fixed to suitable fixed structure of the vehicle 10, but are adjustable in their circumferential position by actuation of the motor 150. As will be apparent, this has the effect of causing the radius of gyration of each liquid mass 32 to occur at a particular point or within a particular sector of its rotation about the axis 34.

Figure 5:
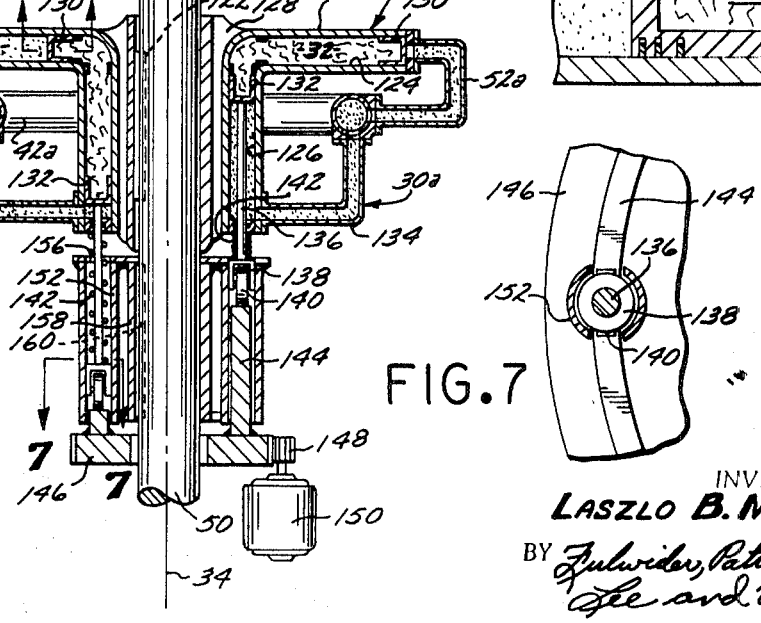
FIG. 5 is a vertical cross-sectional view of a second embodiment of propulsion apparatus according to the present invention.
Figure 7:
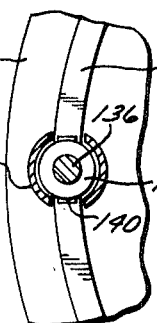
FIG. 7 is an enlarged detail view taken along the line 7-7 of FIG. 5.

As best viewed in FIGS. 5 and 7, each roller 140 and mount 138 is vertically reciprocable within a tube 152 which is slotted to accommodate the circumferentially arranged cam 144. The upper extremities of the tubes 152 are welded to a circular plate 156 which is centrally apertured to fit about the shaft 50. In addition, the periphery of the plate 156 is provided with a plurality of openings to accommodate the reciprocating mounts 138 and rollers 140. The plate 156 is welded to the upper edge of an axially extending sleeve 158 which is connected by a key 160 to the shaft 50. With this arrangement, the plate 156, together with the rollers 140 and the mounts 138 rotate in common with the shaft 50.

In operation, the control motor 150 is operated to position the rise of the cam 144 on the side of the axis 34 toward which movement of the vehicle 10 is desired. Rotation of the cylinders 40a about the axis 34 is then accompanied by radial outward movement of the liquid masses 32 as they pass through the sector of their rotation located about the rise of the cam 144. The resulting increase in the radii of gyration of the masses 32 in that sector results in the development of an unbalanced centrifugal force which causes movement of the vehicle 10 to the right, as viewed in FIG. 5.

Referring now to FIGS. 9 through 11, there is illustrated a third embodiment of the present invention, the embodiment being generally designated by the numeral 162. This embodiment 162 is substantially identical to the first embodiment illustrated in FIG. 2, the only difference in the embodiments being in the particular means by which the liquid masses 32 are moved radially inwardly and outwardly. That is, in the propulsion apparatus 12 a plurality of pistons 36 were utilized to effect the radial movement of the liquid masses 32, under the control of the associated valves 112 and 114. However, in the propulsion apparatus 162, the transfer is accomplished by utilization of an expansible and collapsible hollow member of bag 164 which is located within a cylinder or container. In this regard, where components of the apparatus 162 are the same as those of the apparatus 12, like numerals will be employed. Where the components are not identical, but their operation is similar, like numerals will be employed, but with the subscript b.

Each flexible bag 164, which may be made of a suitable elastomeric material such as neoprene rubber, is fitted over the radially outward open end of each cylinder 40b, and secured thereto in any suitable manner. Each associated container 166 for the bag 164 is welded or otherwise secured to the manifold 42 at one extremity and is rigidly secured at its other extremity to the associated cylinder 40b. A normally closed vent valve 114a is opened upon energization of an associated solenoid 90b. The valve 112b is normally open to admit compressed air from the manifold 42 to the interior of the container 166 through a conduit 168. Upon energization of the associated solenoid 88b, the valve 112b closes to seal off the interior of the container 166 from the air manifold 42.

In operation, a control means like that illustrated in FIG. 4 is utilized to operate the bags 164 of the mass transfer means of the propulsion apparatus 162. More particularly, the cams 98 are adjusted in location, as described in connection with the propulsion apparatus of FIG. 4, and, assuming closure of the associated switch 94, the solenoids 88b and 90b are simultaneously energized. This causes compressed air within the interior of the container 166 to be vented through the now-open valve 114b. Simultaneously, the valve 112b is moved to its closed position to stop the passage of compressed air from the manifold 42 into the container 166.

As previously described in conjunction with the embodiment of FIG. 4, it will be understood that the diametrically oppositely located container 166 is pressurized with air from the manifold 42. Thus, there is a transfer of a portion of the mass 32 in that cylinder into the central reservoir 44. A corresponding movement of a portion of the mass in the reservoir 44 moves into the cylinder 40b of FIG. 9, expanding the bag 164 to the state illustrated in FIG. 10. Thus, the radius of gyration of the liquid 32 is altered so as to allow the development of an unbalanced centrifugal force to effect movement of the associated vehicle 10 to the right, as viewed in FIG. 10.

From the foregoing it will be apparent that a propulsion apparatus is provided by the present invention which is effective to propel a vehicle by utilization of the unbalanced centrifugal force resulting from cyclical adjustment of the radius of gyration of a plurality of rotating masses. The propulsive effect is independent of any interengagement between the propelled vehicle and the supporting surface or medium.

Various modifications and changes may be made with regard to the foregoing detailed description without departing from the spirit of the invention.

I claim:

1. A propulsion apparatus comprising a movable frame; rotatable means carried by said frame and including a plurality of masses rotatable relative to said frame and about a common axis, each said mass comprising a body of liquid of relatively high specific gravity; mass transfer means operative to vary the radius of gyration of said masses during rotation thereof by moving part of said masses radially inwardly and allowing a generally oppositely located part of said masses to move radially outwardly; and control means for cyclically operating said mass transfer means to increase said radius of gyration of each said mass during travel thereof through a predetermined sector on one side of said axis, and to decrease said radius of gyration during travel thereof through a predetermined sector on the opposite side of said axis whereby an unbalanced centrifugal force occurs to move said frame.

2. A propulsion apparatus according to claim 1 wherein said mass transfer means includes a plurality of hollow members arranged in interconnected, diametrically oppositely located pairs to carry said liquid, and said mass transfer means further includes means operative to move some of said liquid radially inwardly between the members of each pair.

3. A propulsion apparatus according to claim 2 wherein said rotatable means includes a plurality of rigid containers housing said hollow members, respectively; wherein each said hollow member is expansible and collapsible within its said container; and wherein said mass transfer means includes means for introducing a fluid under pressure into one said container to collapse the associated said member, while simultaneously venting the opposite said container of the pair to allow expansion of the associated said member whereby said liquid passes from the collapsed one to the opposite one of said members.

4. A propulsion apparatus according to claim 1 wherein said rotatable means includes a plurality of containers, each having a radially extending first portion and an axially directed second portion; wherein such said body of liquid is located in said containers; and wherein said mass transfer means is operative to move some of said liquid between said first and second portions.

5. A propulsion apparatus according to claim 4 wherein said mass transfer means includes a plurality of pairs of floating pistons in said first and second portions of said containers, respectively, with said liquid therebetween; and wherein said mass transfer means further includes a plurality of push rods operative against those of said pistons located in said second portions whereby said liquid is moved into said first portions; and wherein said mass transfer means further includes return means tending to move said pistons in said first portions radially inwardly in the absence of operation of said push rods.

6. A propulsion apparatus according to claim 5 wherein said return means includes means applying fluid under pressure to the radially outward faces of said pistons in said first portions.

7. A propulsion apparatus according to claim 5 wherein said control means includes a cam mounted to said frame and having a cam surface engaging said push rods and provided with a cam rise operative to sequentially operate said push rods upon rotation of said rotatable means relative to said frame.

8. A propulsion apparatus according to claim 7 wherein said cam is adjustable on said frame to adjust the circumferential position of said cam rise to thereby determine the location of said predetermined sectors and thereby control the direction of movement of said frame under the influence of said unbalanced centrifugal force.

9. A propulsion apparatus according to claim 1 wherein said rotatable means includes a central reservoir, includes a manifold for distributing fluid under pressure, and further includes a plurality of radially oriented cylinders extending between said reservoir and said manifold; wherein said mass transfer means includes a plurality of pistons in said cylinders, respectively; wherein one said body of liquid is located in each said cylinder radially inwardly of the associated said piston, all of said bodies of liquid being an integral part of a large mass of said liquid filling said central reservoir; and wherein said control means includes valves operative for admitting said fluid from said manifold and into certain ones of said cylinders to move said pistons radially inwardly, and further operative for venting said fluid from the oppositely located said cylinders to allow the associated said pistons to move radially outwardly whereby said unbalanced centrifugal force occurs.